US007295199B2

(12) United States Patent
Foo et al.

(10) Patent No.: US 7,295,199 B2
(45) Date of Patent: Nov. 13, 2007

(54) MATRIX DISPLAY HAVING ADDRESSABLE DISPLAY ELEMENTS AND METHODS

(75) Inventors: Ken K. Foo, Gurnee, IL (US); Robert J. Bero, Spring Grove, IL (US); Pinky Yu, Grayslake, IL (US)

(73) Assignee: Motorola Inc, Schaumburg, IL (US)

( * ) Notice: Subject to any disclaimer, the term of this patent is extended or adjusted under 35 U.S.C. 154(b) by 613 days.

(21) Appl. No.: 10/647,723

(22) Filed: Aug. 25, 2003

(65) Prior Publication Data

US 2005/0057552 A1 Mar. 17, 2005

(51) Int. Cl.
*H04N 5/228* (2006.01)

(52) U.S. Cl. .......................... 345/214; 345/5; 345/204; 345/205; 348/222; 249/56

(58) Field of Classification Search ................ 345/1.1, 345/1.3, 5, 204, 205, 214; 348/222; 349/56
See application file for complete search history.

(56) References Cited

U.S. PATENT DOCUMENTS 3,609,703 A * 9/1971 Peacock .................. 340/146.2
4,345,249 A * 8/1982 Togashi ...................... 345/103
4,641,135 A * 2/1987 Hilbrink ...................... 345/91
4,764,686 A * 8/1988 Rischmuller ................. 327/484
5,408,248 A * 4/1995 Crossland et al. ............ 345/96
5,774,104 A * 6/1998 Crossland et al. ............ 345/96
6,064,364 A 5/2000 Katoh et al.
6,094,704 A * 7/2000 Martin et al. ............... 711/105
6,100,879 A 8/2000 Da Costa
6,157,375 A 12/2000 Rindal et al.
6,396,485 B1 5/2002 Minami
6,476,914 B1 * 11/2002 Hoelzl et al. ............... 356/400
6,888,568 B1 * 5/2005 Neter ...................... 348/222.1
2003/0020671 A1 * 1/2003 Santoro et al. .............. 345/1.3
2003/0210363 A1 * 11/2003 Yasukawa et al. .......... 349/110
2006/0209009 A1 * 9/2006 Schlangen et al. .......... 345/107

FOREIGN PATENT DOCUMENTS

RU 2089941 C1 9/1997
RU 2160933 C2 12/2000
SU 468274 6/1973
SU 970438 4/1981
SU 1136324 A 1/1985

OTHER PUBLICATIONS

Kaplinsky, Cecil, H; Programmable Logic Gates, Pub. date Dec. 17, 1997; EP 0 472 594 B1.*
Whitby, Rodney; Display line dispatcher apparatus; Pub. date Jul. 27, 1994; EP 0 608 056 A1.*

* cited by examiner

*Primary Examiner*—Richard Hjerpe
*Assistant Examiner*—Vincent E. Kovalick
(74) *Attorney, Agent, or Firm*—Roland K. Bowler, II

(57) ABSTRACT

A display device including a plurality of display elements (500) arranged in a matrix, wherein each display element includes a display pixel (510) coupled to a switch (530), and each display element includes an addressable latch (540) having an output coupled to a controlling input of the switch. The addressable latch includes a row address input (532) and a column address input (556). In one mode of operation, at least some display elements are activated at a first rate, and other display elements are activated at a second rate less than the first refresh rate by selectively addressing the display elements.

18 Claims, 8 Drawing Sheets

-- PRIOR ART --

-- PRIOR ART --

MATRIX DISPLAY HAVING ADDRESSABLE DISPLAY ELEMENTS AND METHODS

FIELD OF THE DISCLOSURE

The present disclosure relates generally to matrix display devices, and more particularly to display devices comprising matrices of addressable display elements suitable for use in low power electronics devices, for example, in battery-powered wireless mobile communications devices, and methods.

BACKGROUND OF THE DISCLOSURE

Many existing matrix display devices, for example, Thin-Film-Transistor (TFT) displays having RAM-less driver Integrated Circuits (ICs), operate on 4 control signals: vertical synchronization (Vsync); horizontal synchronization (Hsync); pixel clock (Dotclk); and data output enable (OE) signals. The Vsync signal or other signal controls each frame. The Hsync signal or other signal controls each line. The Dotclk signal or other signal controls each pixel. And the data OE signal or other signal determines whether the input data is valid or invalid. Data are written when the OE signal is active in synchronization with the Vsync, Hsync and Dotclk signals.

Prior Art FIG. 1 illustrates timing waveforms for a conventional 4×4 matrix TFT display active at 60 frames per second (fps). In the Vertical Timing waveform, the Vsync pulse indicates the start of a new frame. Within each frame, there are four Hsync pulses corresponding to each of the four horizontal rows. In the Horizontal Timing waveform, the Hsync pulse indicates the start of a new row. Within each row, there are four Dotclk signals corresponding to each of the four pixels in each row. The OE signal, which is active when high, indicates that the input is valid display data.

It is known generally to activate only portions of the display by adjusting the OE timing signal so that a portion of the display is inactive. In Prior Art FIG. 2, the OE timing signal is active on only horizontal rows 2 and 3 of the display, but not on rows 1 and 4 of the display where in rows 1 and 4 are inactive. The active portion of the display may start from any row, depending on when the OE signal in the Vertical Timing axis is active. The partial screen size may vary from one row to full screen depending on the duration of the OE active pulse. Areas of the display where the OE signal is inactive are non-display areas where images are not shown.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
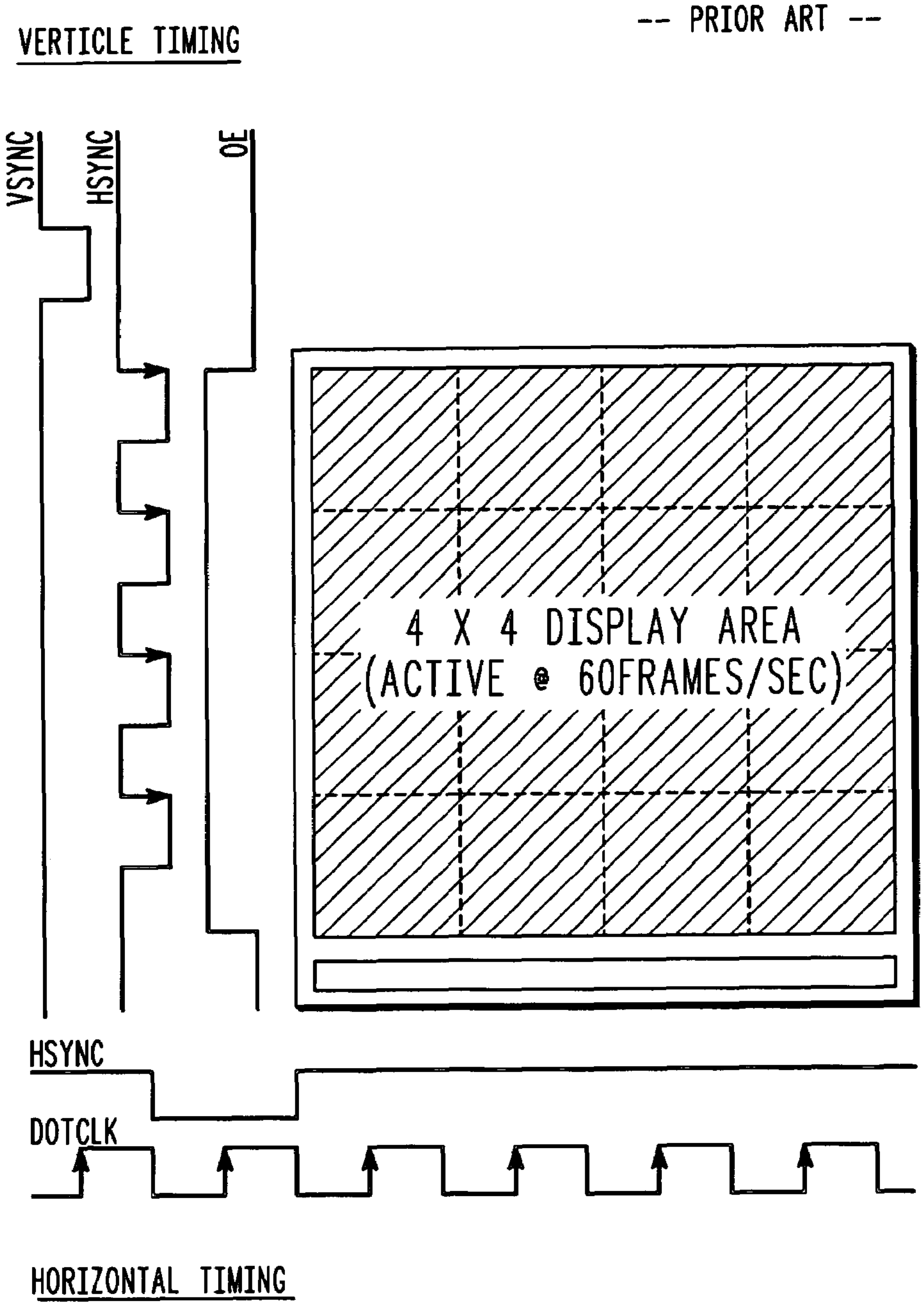
FIG. 1 is a prior art matrix display timing-diagram for a fully active display.
Figure 2:
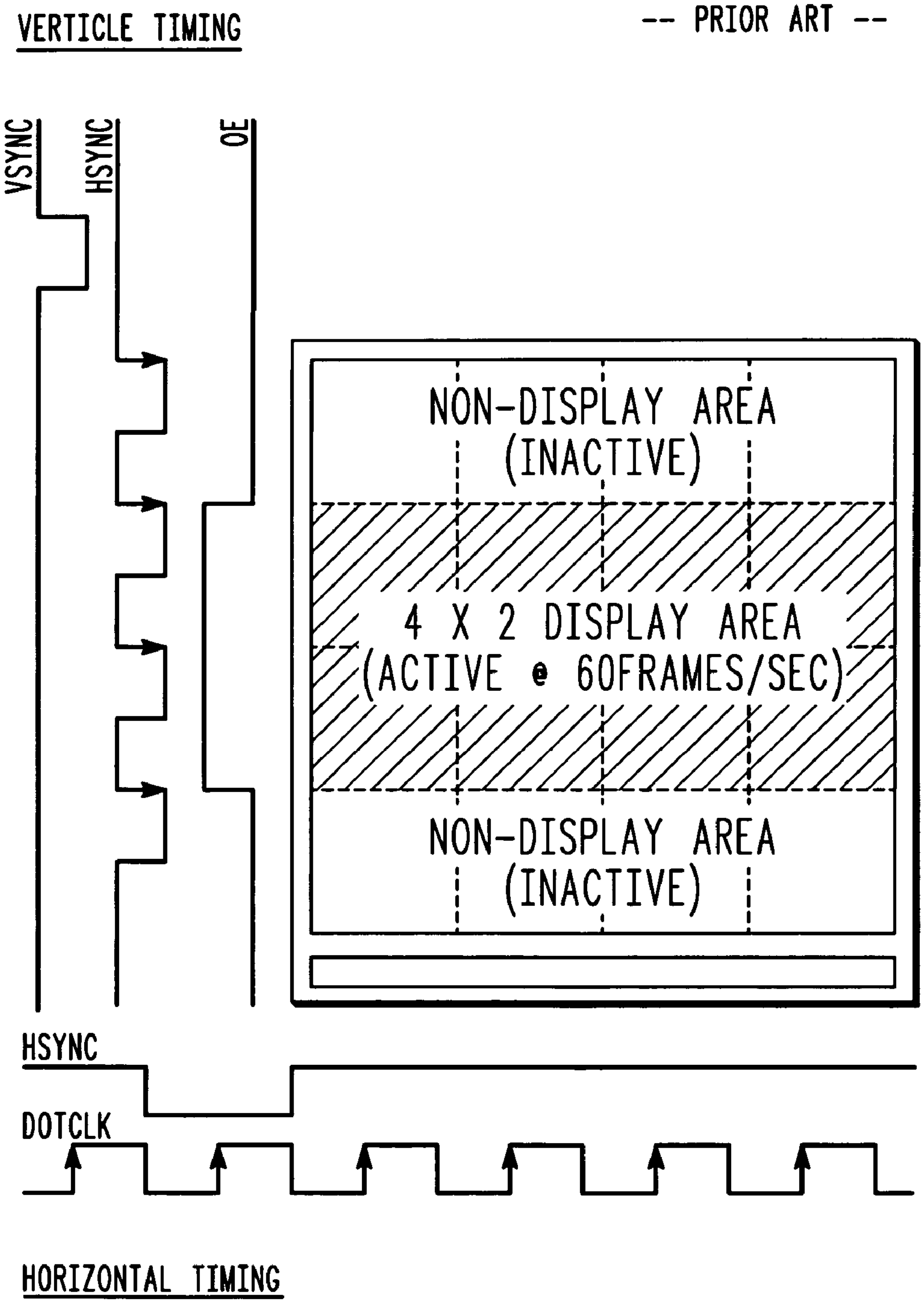
FIG. 2 is a prior art matrix display timing-diagram for partially active and partially inactive display portions.
Figure 3:
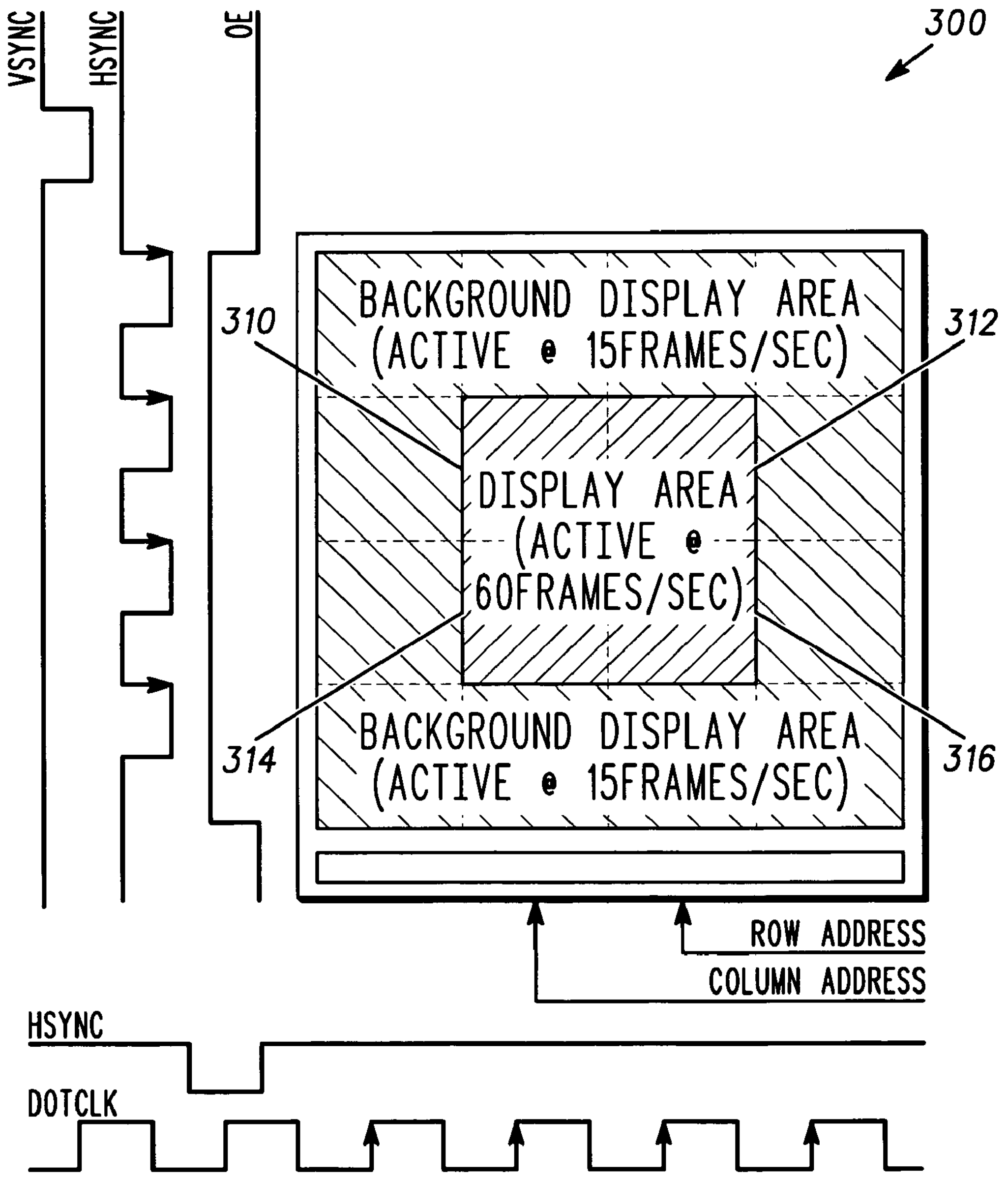
FIG. 3 is a schematic illustration of a matrix display device having active display elements addressed at different rates or frequencies.

FIG. 3 illustrates an exemplary display device 300, for example, a thin-film-transistor-display, comprising a 4×4 (n×m) array of addressable display elements. Other displays types may be employed in other embodiments. According to one aspect of the disclosure generally at least some display elements are activated or addressed, for example, refreshed, at a first rate and other display elements are activated or addressed at a second rate. In FIG. 3, for example, the four central active display elements 310, 312, 314 and 316 are addressed at a rate of 60 frames per sec (fps), and the remaining display elements are addressed at a lesser rate of 15 fps. In some embodiments, power consumption of the display device is reduced by addressing at least some of the display elements at a lesser rate than others, since power is proportional to the frequency with which the display elements are addressed.

Figure 4:
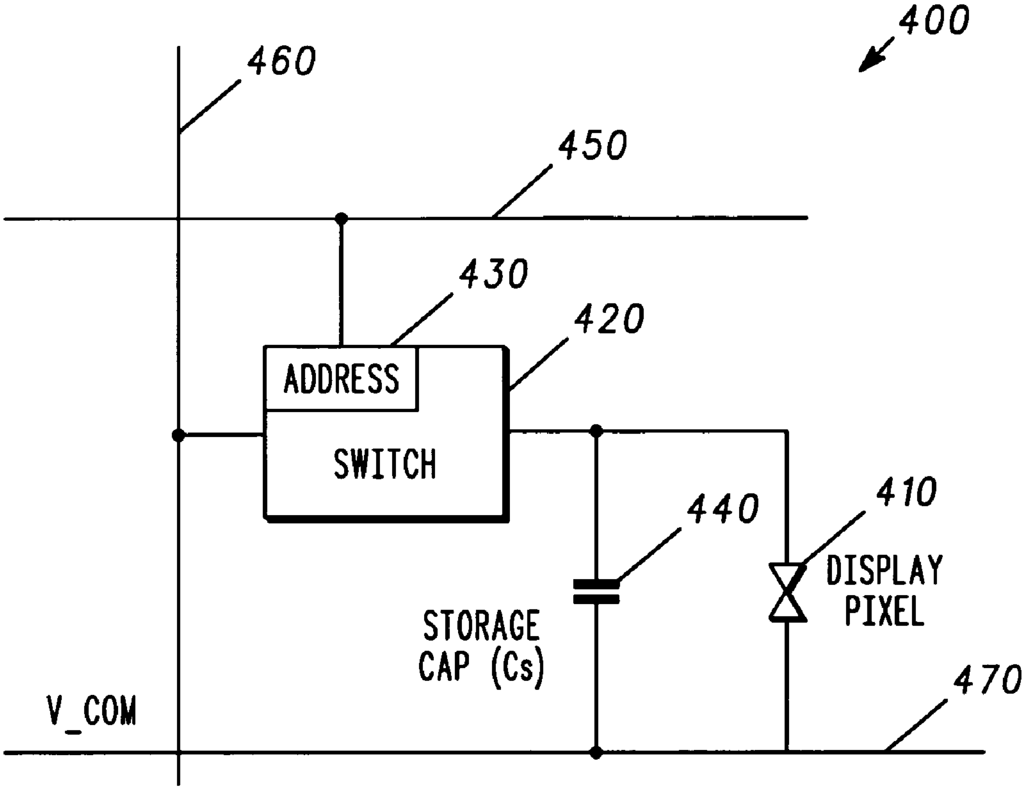
FIG. 4 is schematic diagram of an exemplary addressable display element.

FIG. 4 illustrates an exemplary addressable display element 400 comprising generally a display pixel 410, for example, a liquid crystal display (LCD), or a light emitting diode (LED), electro-luminescent (EL), etc., coupled to a switch 420, which is enabled and disable by addressable logic 430. The exemplary display element includes a row electrode 450 and a column electrode both coupled to the logic 430. The exemplary display element also includes row and column address inputs, examples of which are discussed further below, to the addressable logic. The exemplary display pixel 410 includes a capacitor 440 disposed in parallel therewith, both of which are coupled to a bias voltage electrode 470. Generally, the switch 420 activates the display pixel 410 when logic inputs satisfy a logical condition.

Figure 5:
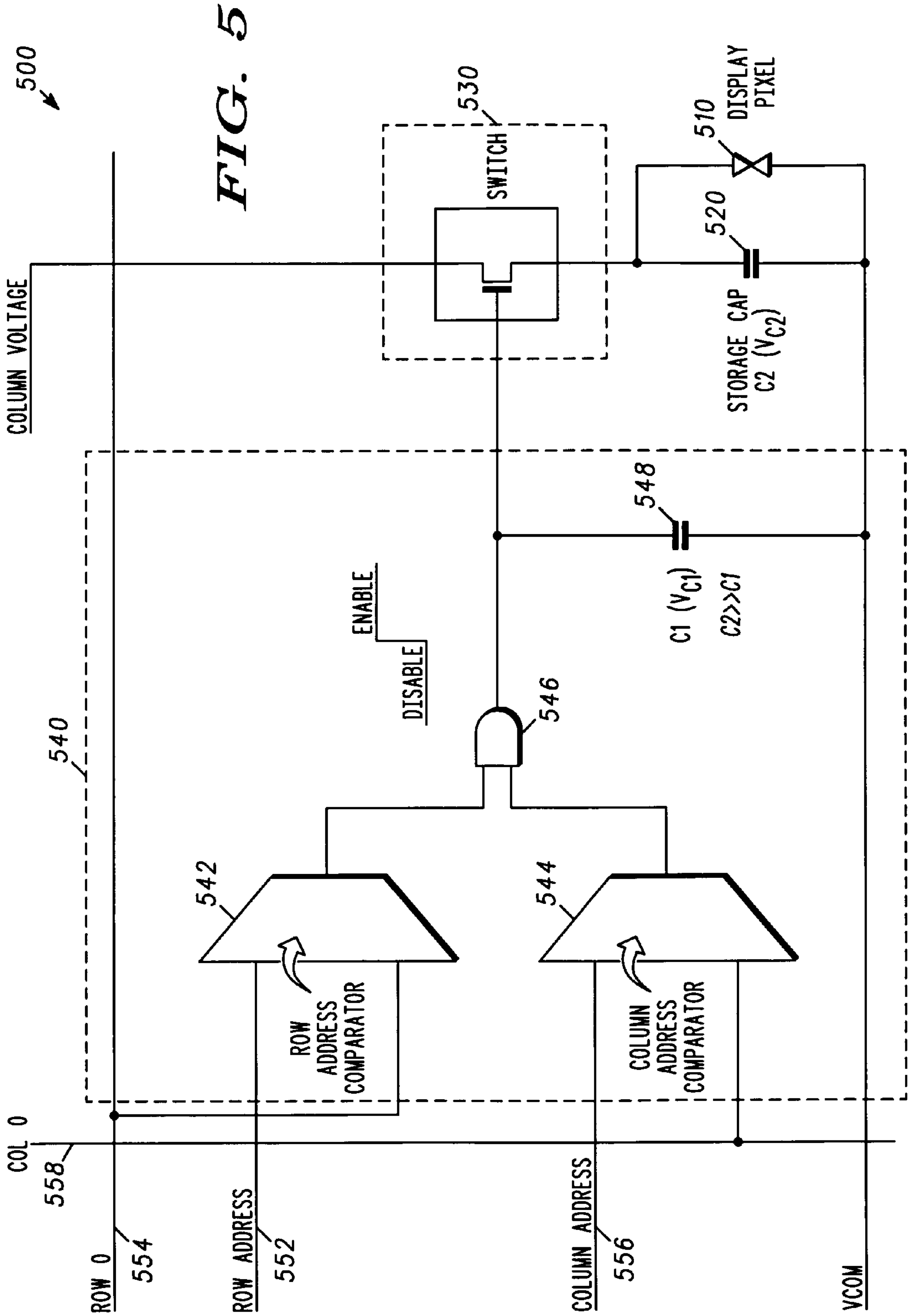
FIG. 5 is more detailed schematic diagram of an exemplary addressable display element.

FIG. 5 is a more detailed diagram of an exemplary addressable display element 500, which comprises a display pixel 510 and a corresponding parallel capacitor 520. The display pixel 510 is coupled to a switch 530, for example, to the source or drain of a field effect transistor (FET). Other switching elements may be used in other embodiments. The exemplary logic includes an addressable latch 540 having an output coupled to a controlling input of the switch 530. The exemplary latch includes a row address comparator 542 and a column address comparator 544, both of which have outputs coupled to inputs of a logic gate, for example, an AND gate 546. The output of the exemplary logic gate is coupled to the switch 530 for enabling and disabling the switch. In FIG. 5, there is also a capacitor 548 coupled to the input of the switch 530 and to the output of the logic gate 546. The switch enabling output of the exemplary AND gate 546 charges the capacitor 548, which enables the logic controlled switch thereby activating the display element. Data may be written to the pixel of the display element when activated, for example, to refresh the pixel or write new data to the pixel. In one embodiment, the capacitance of the pixel capacitor 520 is much greater the capacitance of switch enabling capacitor 548.

In the exemplary addressable display element of FIG. 5, the display element is activated by applying row and column address inputs and row and column electrode inputs to the display element logic, which controls the logic controlled switch 530, as discussed above. The row address input 552 and the row electrode input 554 are compared by the comparator 542, and the column address input 556 and the column electrode input 558 are compared by the comparator 544. The output of the two comparators 542 and 544 controls the activation of the display pixel by enabling and disabling the switch 530, the exemplary operation of which is discussed above. In the exemplary embodiment, data may be written to a display element pixel only if both the output of the row address comparator and the output of the column address comparator are true.

The outputs from the row address comparator and the column address comparator are input to the AND gate, which provides the enabling or disabling signal to the charging capacitor 548 used to turn on or off the switch for the corresponding display pixel. If the output of the AND gate is true, switch capacitor 548 is charged, thus enabling the switch 530. The enabled switch 530 permits charging capacitor 520, which activates the exemplary display pixel 510 so that it may be refreshed or updated. If the output of the AND gate 546 is false, capacitor 548 is not charged, the transistor remains OFF, and data cannot be written to the display pixel 510.

Figure 6:
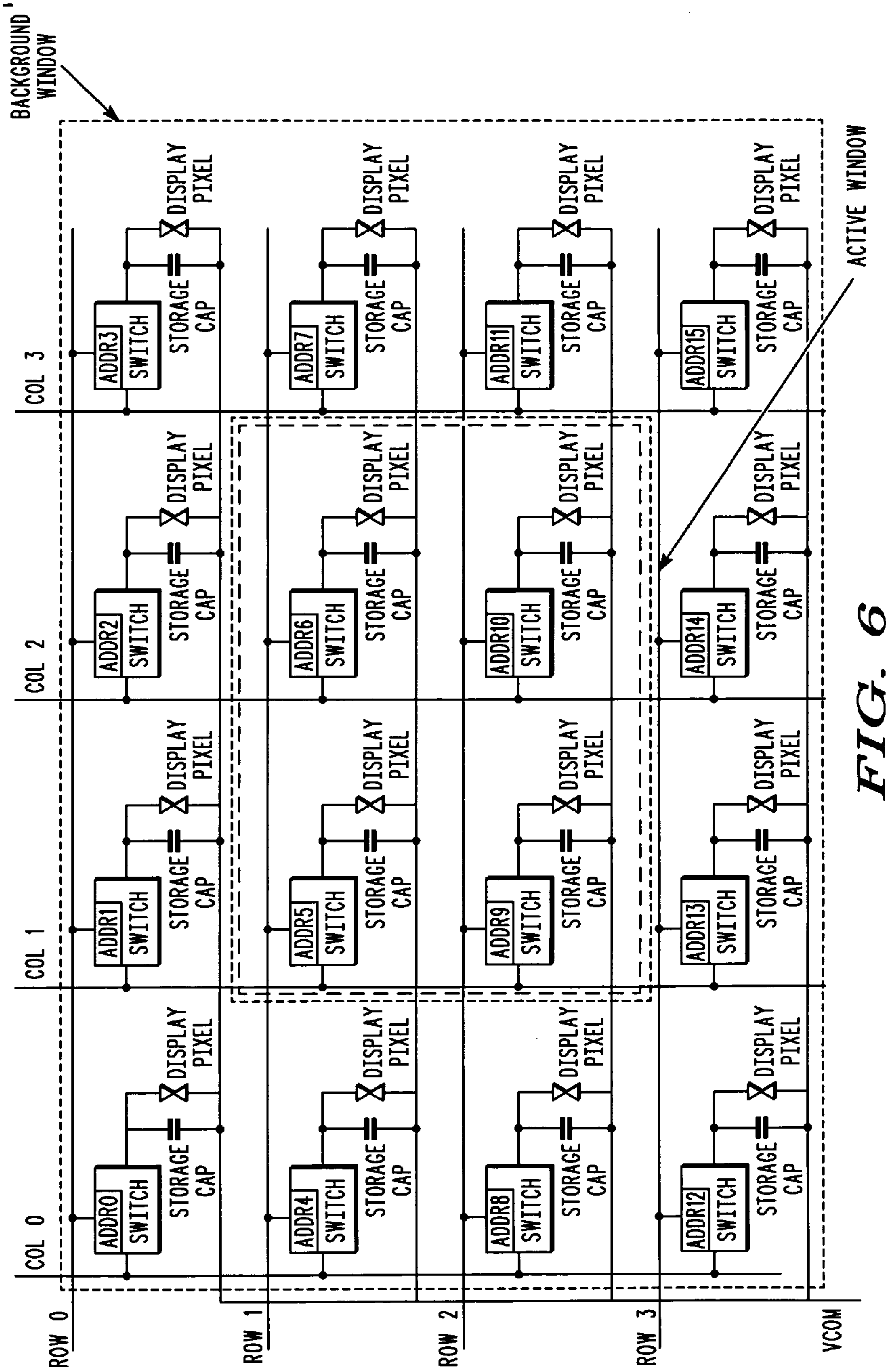
FIG. 6 is an exemplary display device comprising a plurality of individually addressable display elements.
Figure 7:
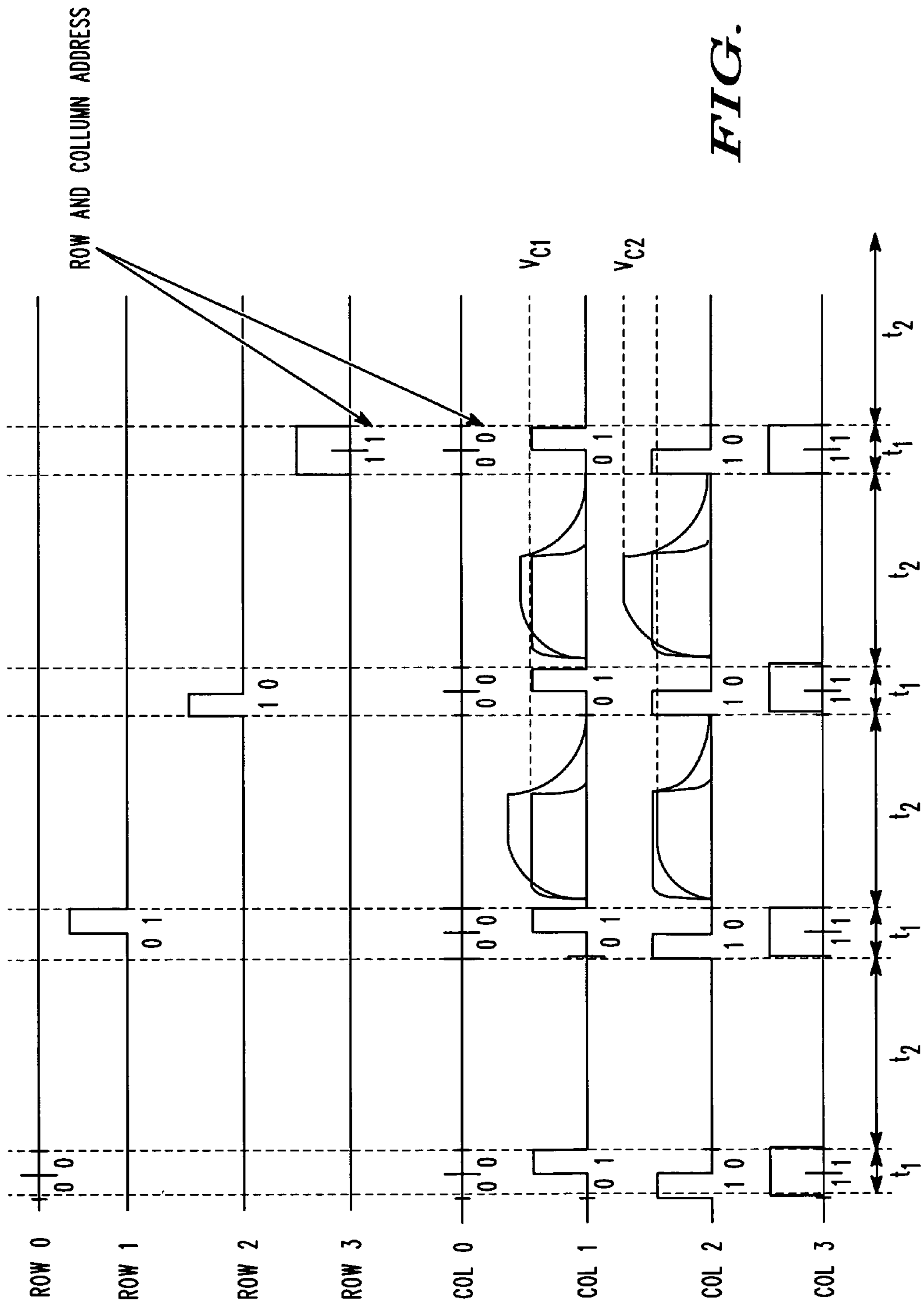
FIG. 7 is an exemplary timing diagram for an exemplary matrix display device.

FIG. 6 is an exemplary display device 600 comprising a plurality of individually addressable display elements, for example, addressable display elements of the exemplary type illustrated in FIG. 4 or in FIG. 5. FIG. 7 illustrates exemplary waveforms of rows and columns 0, 1, 2 and 3 corresponding to the active pixels addresses (Addr) 5, 6, 9 and 10 in FIG. 6. The row addresses (00, 01, 10, 11) and column addresses (00, 01, 10, 11) are provided externally, as discussed further below. The number of bits representing the row and column addresses increase as the number of rows and columns increase. In FIG. 7, "$t_1$" is the time duration to decode the pixel row address and column address. "$t_2$" is the time duration to charge the switch enabling capacitor, e.g., switch capacitor 548 in FIG. 5. The switch enabling capacitor enables the display element switch, the operation of which is discussed above. In FIG. 7, "$V_{C1}$" is the charged up voltage of the switch enabling capacitor, e.g., capacitor 548 in FIG. 5, and "$V_{C2}$" is the charged up voltage of pixel capacitor, e.g., capacitor 520 in FIG. 5. The time required to charge the switch enabling capacitor is less than the pixel capacitor because the capacitance of the switch enabling capacitor is substantially less than the capacitance of the pixel capacitor. In FIG. 7, "$V_{C2}$" is generally different for each active pixel since the intensity of each pixel is generally different. Alternative addressable display elements may have different timing signal diagrams.

FIG. 3 illustrates Vsync, Hsync Dotclk and OE signals, which are applied to the rows and columns of an exemplary matrix of display elements. FIG. 3 also illustrates row and column address inputs applied to the matrix of display elements. In the display and driver schematic of FIG. 8, a timing signal generator 810 generates display input signals, for example, the Vsync, Hsync, Dotclk, OE (or equivalents) and the row address and column address inputs illustrated in FIG. 3. A driver integrated circuit (IC) coupled to the output of the timing signal generator processes the input signals from the timing signal generator, and outputs the high voltage row and column waveforms to the display matrix 840, for example, the thin-film-transistor display matrix array illustrated in FIG. 6.

Figure 8:
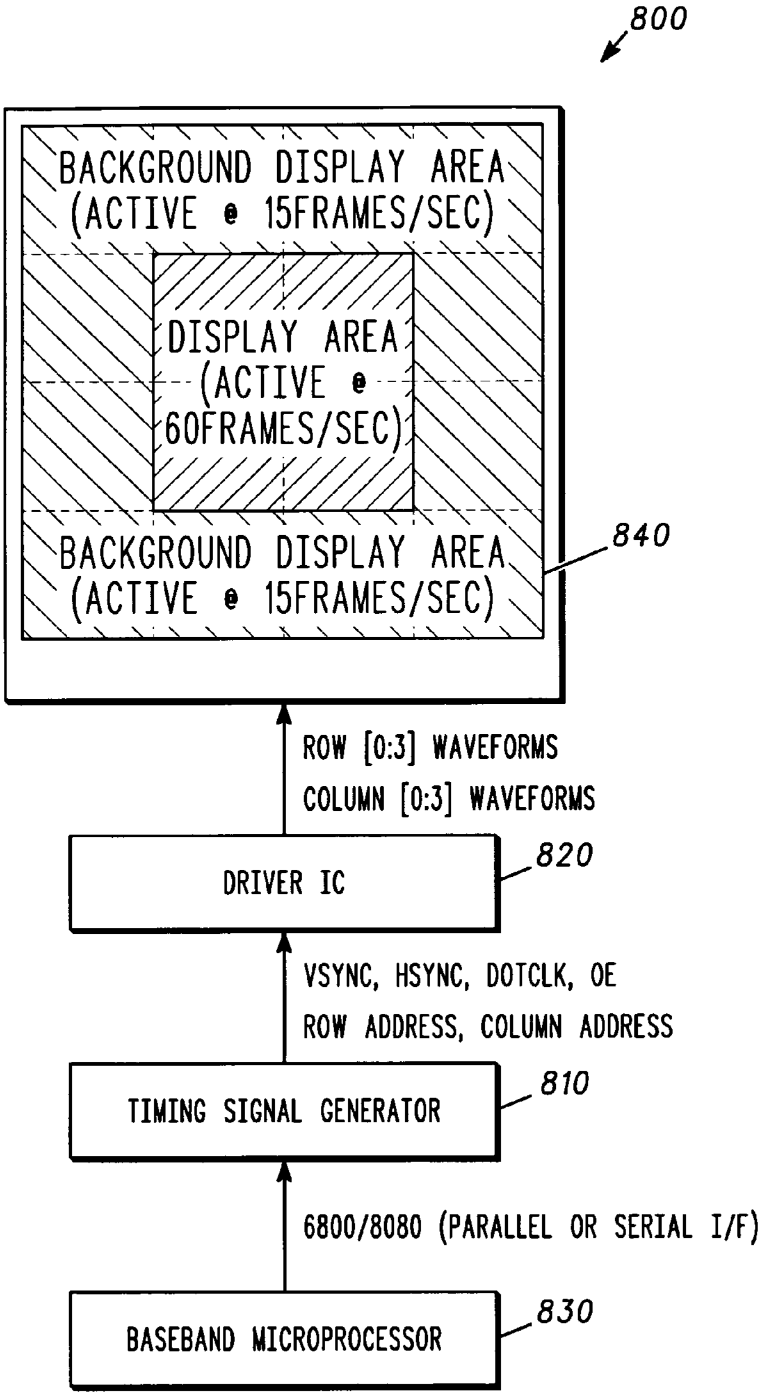
FIG. 8 is an exemplary schematic of a display device with control timing and driver elements.

In FIG. 8, a baseband processor 830 generates the control signals for the timing signal generator 810 via a parallel or serial interface. By providing a display device comprising a matrix of addressable display elements, for example, those illustrated in FIGS. 4 and 5, select portions of the display may be activated by addressing specific display elements. The size and location of the active display portion may be selected and changed dynamically depending on changing display requirements. For example, the display may be reconfigured to reduce power consumption based on the size of active window. These features are useful in low power applications, for example, in mobile wireless communications devices including battery power cellular telephones, among other devices where it is desirable to reduce power consumption. In other applications, power consumption is not necessarily a concern, and it may be desirable primarily to selectively control the activation of display elements.

The exemplary matrix display device and more particularly the display elements thereof may be activated, for example, to be rewritten with new data or to be refreshed, at different frequencies. In some applications, it may be possible or desirable to activate groups of display elements at different rates, for example, to reduce power consumption or to reduce processing and/or memory resources. Overall power consumption is generally proportional to frequency. In one application, for example active and background windows can be addressed with different frequencies as shown in FIG. 3. This operation should be transparent to the users even though the frame update rates of the active and background windows are different. According to the calculations below, a power savings of approximately 50% may be obtained compared to conventional display operation that does not include reducing the activation rate for some display elements. In the example below, four (4) foreground pixels are pixels are activated at 60 frames per second (fps) and twelve (12) background pixels are activated at 15 fps.

| | | |
|---|---|---|
| Power (foreground) = | 60 * 4 Cs * $V_2$ | (@ 60 fps) |
| Power (background) = | 15 * 12 Cs * $V_2$ | (@ 15 fps) |
| Total Power = | 420 Cs * $V_2$ | |

$C_S$ is pixel capacitor, for example, capacitor 440 in FIG. 4. By comparison, the power without reduced activation rate, i.e., where all 16 display elements are scanned at 60 fps, is 60*16 $C_S$*$V_2$=960 $C_S$*$V_2$. The ratio is 420/960=44%. This type of operation may be desirable in applications where there is a standby mode of operation, for example, in cellular handsets, among other devices.

In other embodiments or applications, only a portion of the display is activated while other portions of the display are not activated. This can be performed by selectively addressing the desired display elements with the row and column address inputs, as discussed above. Thus in the exemplary mode of operation discussed above, one of the activate rates may be such that some of the display elements are not activated.

While the present disclosure and what is presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method of activating a display element of a display device having n×m array of display elements, each display element coupled to a logic controlled switch, the method comprising:

applying a row address input and a row electrode input to control logic of the logic controlled switch of the display element;

applying a column address input and a column electrode input to the control logic of the logic controlled switch of the display element;

activating the display element with the logic controlled switch when the row address and row electrode inputs and when the column address and column electrode inputs satisfy a condition.

2. The method of claim 1, comparing the row address input and the row electrode input, comparing the column address input and the column electrode input, activating the display element with the logic controlled switch based on results of the comparisons.

3. The method of claim 2, controlling the logic-controlled switch includes enabling and disabling the logic controlled switch with a charging capacitor.

4. The method of claim 1, activating at least some display elements of the display device at a first refresh rate, activating other display elements of the display device at a second refresh rate, different than the first refresh rate.

5. A method in a display device comprising an n×m array of addressable display elements, the method comprising:

activating at least some display elements characterizing a foreground image at a first rate;

activating other display elements characterizing a background image at a second rate, the second rate less than the first rate;

activating the display elements with a corresponding logic controlled display element switch when row address and row electrode inputs and when the column address and column electrode inputs satisfy a condition.

6. The method of claim 5, comparing the row address input and the row electrode input, comparing the column address input and the column electrode input, activating the display element with the logic controlled display element switch using the results of the comparisons.

7. The method of claim 6, enabling and disabling the logic controlled display element switch with a switch enabling charging capacitor controlled by the results of the comparisons.

8. The method of claim 5, activating other display elements at the second rate includes not activating the other display elements.

9. A display device comprising:

a plurality of display elements arranged in a matrix, each display element including a display pixel coupled to a switch, each display element including an addressable latch having an output coupled to a controlling input of the switch, the addressable latch having a row address input and a column address input.

10. The device of claim 9, the addressable latch having a row electrode input and a column electrode input.

11. The device of claim 9, the addressable latch of each display element including row address logic and column address logic having corresponding outputs coupled to the output of the addressable latch, the row address input coupled to the row address logic, the column address input coupled to the column address logic.

12. The device of claim 9, the addressable latch of each display element including first and second comparators, the first comparator having the row address input and a row electrode input, the second comparator having the column address input and a column electrode input, each display element including a logic device having a first input coupled to an output of the corresponding first comparator, the logic device having a second input coupled to an output of the corresponding second comparator.

13. The device of claim 12, the logic device is an AND gate, the output of the addressable latch is an output the logic device.

14. The device of claim 12, a pixel capacitor connected parallel with the display pixel, and a switch enabling capacitor coupled to an input of the switch.

15. The device of claim 9 is a thin-film-transistor display device.

16. A method in a display device comprising an n×m array of addressable display elements, the method comprising:

selectively activating display elements by individually addressing the display elements to be activated, activating the display elements includes, applying a row address input and a row electrode input to control logic of the corresponding display element, applying a column address input and a column electrode input to the control logic of the corresponding display element, and activating the display element with a logic controlled switch when the control logic inputs satisfy a condition;

reducing power consumption by addressing at least some of the display elements at a first frequency and addressing other display elements at a second frequency, the second frequency less than the first frequency.

17. The method of claim 16, comparing the row address input and the row electrode input with the control logic, comparing the column address input and the column electrode input with the control logic, activating the display element by enabling the logic controlled switch using the results of the comparisons.

18. The method of claim 17, enabling and disabling the logic controlled switch with a switch enabling capacitor controlled by the control logic.

* * * * *